United States Patent [19]

Overbeek

[11] 4,212,557
[45] Jul. 15, 1980

[54] HUB CLUTCH

[75] Inventor: Robert B. Overbeek, Janesville, Wis.

[73] Assignee: Dana Corporation, Toledo, Ohio

[21] Appl. No.: 950,931

[22] Filed: Oct. 12, 1978

[51] Int. Cl.$^2$ .......................... B60B 27/00; F16D 1/06
[52] U.S. Cl. ...................................... 403/1; 192/67 R
[58] Field of Search ............. 403/1; 192/67 R, 109 A, 192/95

[56] References Cited

U.S. PATENT DOCUMENTS

| | | | |
|---|---|---|---|
| 2,884,101 | 4/1959 | Warn | 403/1 |
| 3,037,598 | 6/1962 | Katka | 192/67 R X |
| 3,125,363 | 3/1964 | Kapusta | 403/1 |
| 3,301,363 | 1/1967 | Juhas | 192/67 R X |
| 3,378,123 | 4/1968 | Papa | 192/67 R X |
| 3,414,096 | 12/1968 | Reed | 403/1 |
| 3,442,361 | 5/1969 | Hegar | 403/1 |
| 3,637,243 | 1/1972 | Kitano et al. | 403/1 |
| 3,718,213 | 2/1973 | Hegar et al. | 403/1 |
| 3,753,479 | 8/1973 | Williams | 403/1 |
| 3,952,838 | 4/1976 | Osten et al. | 192/67 R |
| 3,972,633 | 8/1976 | Wright | 403/1 |
| 4,007,820 | 2/1977 | Kagata | 192/67 R |

*Primary Examiner*—Wayne L. Shedd
*Attorney, Agent, or Firm*—Norbert A. Heban, Jr.

[57] ABSTRACT

An automatic roller-type hub clutch is provided with a manual device operable to override the automatic mechanism to prevent free wheeling due to overrun. An improved resilient coupling is provided for the manual device designed to translate rotational movement from a rotatable selector to a camming device and to provide a built-in self energizing action in both an engaging and disengaging direction. The resilient coupling disclosed is a coiled torsional spring having one end connected to the rotatable selector and the opposite end connected to the camming device. In operation, the rotatable selector is rotated in opposite directions to wind and unwind the spring causing the camming device to rotate with the rotatable selector to axially move a slidable clutch member into engagement with a fixed clutch member.

4 Claims, 6 Drawing Figures

HUB CLUTCH

BACKGROUND OF THE INVENTION

This invention relates to hub clutches for the front wheels of four-wheel drive vehicles and more particularly to an improved actuating mechanism for such clutches.

In four-wheel drive vehicles, it is sometimes desirable to have all four wheels fixedly connected to their drive axles, as for example, when the vehicle is traveling over difficult terrain. However, it is also advantageous to be able to disengage the front wheels or at least permit them to overrun the axle when the vehicle is traveling on a paved or smooth road surface.

Hub clutches for automotive vehicles are well known and are designed for use on light and medium weight vehicles equipped with front driving axles. The hub clutch enables the front wheels to be disengaged from the front drive line when front wheel drive is not desired. Hub clutches allow the front wheels to rotate without "back drag" from the front axle and propeller shaft when four-wheel drive is not needed. This eliminates unnecessary wear and results in greater fuel economy.

The prior art discloses a number of wheel locking hubs which permit the front wheels of a four-wheel drive vehicle to operate in both locked and unlocked modes. Hub clutches of this type are selectively operable between the automatic and normal modes by manual movement of a selector which moves a shiftable clutch member axially into or out of positive locking engagement with an axially fixed clutch member.

A cam is required to translate the rotational movement of the selector into axial movement of the shiftable clutch member. The axial movement enables the shiftable clutch member to engage the fixed clutch member, when the selector is rotated in one direction thereby locking the associated wheel to the front axle. When the selector is rotated in the opposite direction the shiftable clutch member slides axially out of engagement with the fixed clutch member, thereby freeing the wheel from the axle shaft. One of the more common methods of achieving this camming action is by providing an actuator or a nut which is screwed on a helically threaded portion of the selector. Another well known method of accomplishing the camming action is by fixing a cam member to the selector and providing a cam follower plate for engaging and moving the shiftable clutch member in opposite directions.

In either instance, because of the possibility of misalignment between the clutch members when being engaged or due to presence of excessive torque wind-up when engaged, a spring is often provided for engaging the clutch members. For example, if the clutch members are moved to their "lock" position and are circumferentially off-set with relation to each other, the spring becomes compressed and continues to bias the clutch members toward their engaged position. Upon relative movement between the wheel and axle, the spring will snap the clutch members into their engaged position. On the other hand, if the clutch members are in their engaged position and the selector is moved to the "free" position with the clutch members being restrained due to torque wind-up, the spring is placed in tension. As soon as the vehicle is moved slightly, the spring will withdraw the clutch members thereby disengaging the clutch members.

It is advantageous under the above circumstances to have a single resilient means such as a spring capable of acting both in tension and compression. These double acting springs are often used to move the shiftable clutch member and the follower portion of the camming mechanism. However, these clutches require excessive axial space during the clutch shifting operation because the spring must act in an axial direction under both tension and compression. Furthermore, because the springs are located outwardly of the selector, they are more readily susceptible to damage since they are directly associated with the shifting clutch member of the locking hub. Thus, while these mechanisms operate in a satisfactory manner, they are complex, more difficult to assemble and more expensive due to the number of components required to carry out the desired operation.

SUMMARY OF THE INVENTION

It is therefore an object of the present invention to provide a simple and efficient automatic hub clutch.

Accordingly, the hub clutch of present invention overcomes the above problems by providing double acting resilient coupling means between the selector and cam means which is designed to operate in a circumferential manner to enable the desired operation to be carried out in response to winding and unwinding of the resilient coupling means. Further, due to this construction, it is possible to locate the resilient coupling means in a confined space in an area away from the shiftable component of the locking hub. The location is also an important factor since it allows minimum axial travel of the shiftable clutch member to carry out the engaging and disengaging operation.

In a preferred embodiment, the resilient coupling means comprises a coiled torsional spring connected between the rotatable selector and the cam means. The spring serves to translate rotational movement of the selector into axial shifting movement of the shiftable clutch member and is self-disengaging as well as self-engaging.

DETAILED DESCRIPTION OF PRESENTLY PREFERRED EMBODIMENTS

Figure 2:
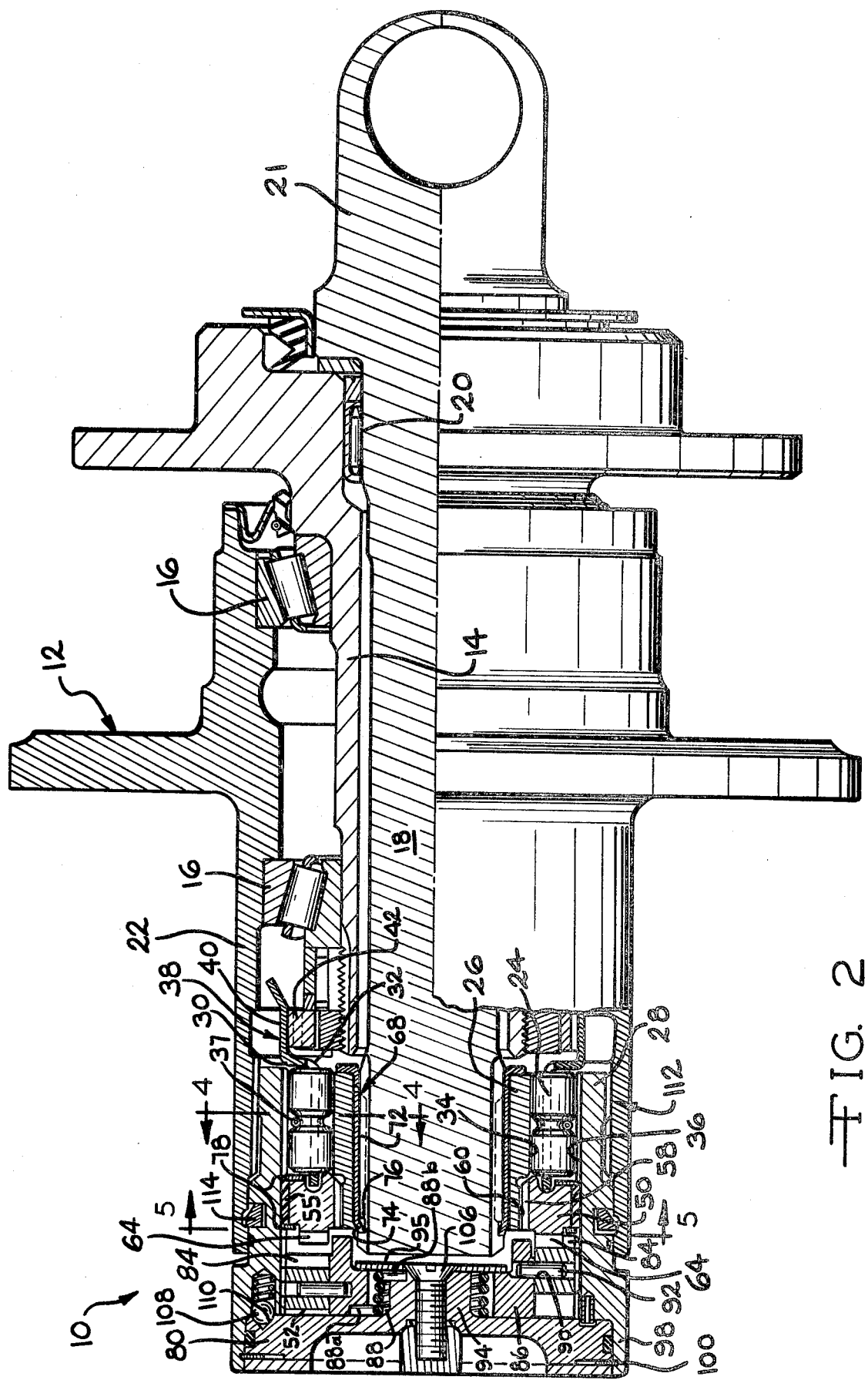
FIG. 2 is a sectional view taken along line 2—2 of FIG. 1 showing the upper portion of the clutch in its disengaged position and the lower portion in its engaged position.

Referring to the drawings and specifically to FIG. 2 a hub clutch 10 of the present invention is adapted to be mounted to the front wheel assembly 12 of a four-wheel drive vehicle. The wheel assembly 12 is rotatably mounted on a non-rotatable tubular wheel bearing spindle 14 by conventional spaced tapered roller bearing assemblies 16. A power or axle shaft 18 extends through and horizontally along the central axis of spindle 14 and is rotatably supported therein by a needle bearing assembly 20. The inner end of the axle shaft 18 is connected by a yoke 21 to conventional differential gearing (not shown).

In a preferred embodiment, the hub clutch 10 comprises both an automatic and a manual locking mechanism for selectively connecting the outer end of the axle shaft 18 to a cylindrical wheel supporting hub 22 which forms a part of the wheel assembly 12. The automatic locking mechanism is essentially the same as that shown and described in U.S. Pat. No. 3,414,096 entitled "Automatic and Manual Means for Hub Clutch" in the name of George R. Reed and assigned to Dana Corporation. Disengaging and releasing means are provided as a part of the automatic locking mechanism to permit automatic alternate free wheeling and driving engagement between the hub 22 and axle shaft 18. This means is an overrunning clutch comprising a series of roller engaging means 24 mounted between an inner race 26 splined to the end of the axle shaft 18 and an outer race 28 splined to the interior of the wheel hub 22. An annular cage 30 has a series of roller retaining slots 32 for circumferentially spacing rollers 24 around the inner race 26. The slots 32 are of sufficient size to provide clearance for permitting the rollers 24 to float slightly axially and radially relative to the cage 30 and thereby relative to the inner and outer races 26 and 28.

Figure 4:
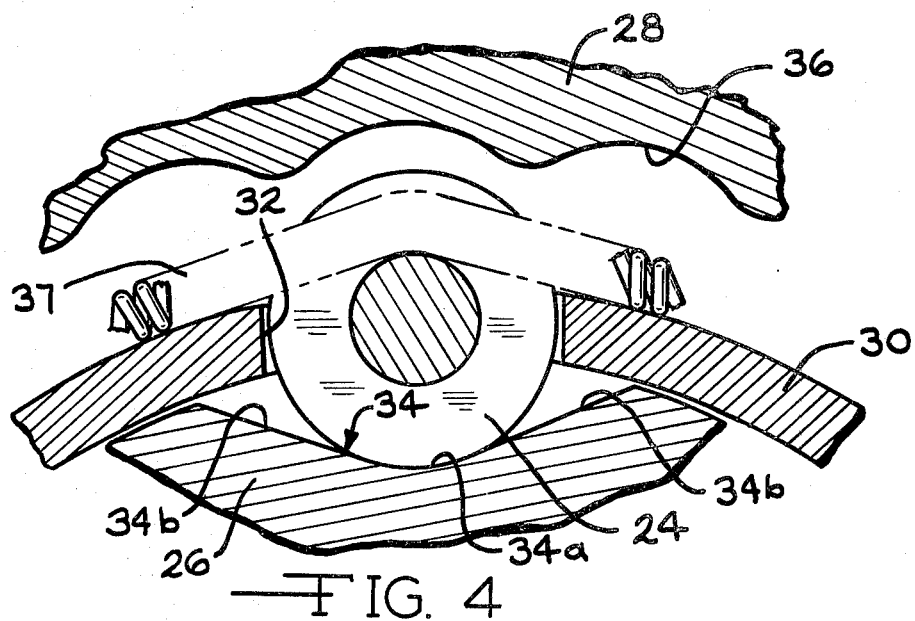
FIG. 4 is a partial view similar taken along line 4—4 of FIG. 2.

As best seen in FIG. 4, the inner race 26 has its cylindrical outer surface formed with a plurality of circumferentially spaced and axially extending grooves 34. Each groove 34, when viewed in cross-section, has a deep central portion 34a bounded by a pair of inclined side walls 34b that extend from the central portion 34a to the cylindrical outer surface of the inner race 26.

The internal cylindrical surface of the outer race 28 has a plurality of circumferentially spaced and axially extending flutes 36 in opposed relation to inner race grooves 34. When viewed in cross-section, the arc radius of these flutes 36 is approximately the same as the roller radius.

When the rollers 24 are disengaged, they fully contact the central portion 34a of the inner race groove 34 and their outer peripheries project beyond the outer surface of the inner race 26. The rollers 24 are normally urged radially inwardly by an annular coil spring 37. As the rollers 24 are cammed up the sides 34b of the inner race grooves 34, they are forced radially outwardly into the outer face flutes 36.

Referring again to FIGS. 2 and 3, an arresting means 38 is utilized to automatically engage the inner and outer races 26 and 28. The arresting means 38 comprises an extension 40 on the cage 30. The extension 40 is adapted to cooperate with a C-shaped brake ring 42 non-rotatably mounted on the inner end of the wheel bearing spindle 14.

Upon rotation of the axle shaft 18 relative to the hub 22, the arresting means 38, through a resilient frictional engagement between the cage extension 40 and the spindle brake ring 42, inhibits rotating movement of the roller cage 30. The arresting means acts like a trigger to urge the rollers 24 outwardly into engagement with the inner and outer races 26 and 28 as the inner race 26 rotates rotative to it. After engagement, the rollers 24 and cage 30 rotate with the inner and outer races 26 and 28 accompanied by resilient frictional slipping between the extension 40 and brake ring 42.

The automatic portion of the hub clutch 10 operates like a conventional overrunning hub clutch such as that disclosed in the previously mentioned U.S. Pat. No. 3,414,096. In the device of the present invention the torque transmitting members are the rollers 24. The overrunning clutch is engaged by the brake ring 42 which rotates the rollers 24 as the axle shaft 18 is turned. As the drive axle 18 is rotated under power, each roller is driven up the inclined side walls 34b of the grooves 34 and outwardly into the flutes 36, thereby connecting the inner race 26 to the outer race 28. if the manual portion of the hub clutch 10 is in its disengaged position as shown in the upper portion of FIG. 2, the hub 22 is driven by the axle shaft 18 thereby transmitting drive to the vehicle wheel (not shown). Under these conditions the vehicle is in automatic four-wheel drive with the overrunning clutch in position to prevent the wheel from driving the axle shaft 18.

Figure 5:
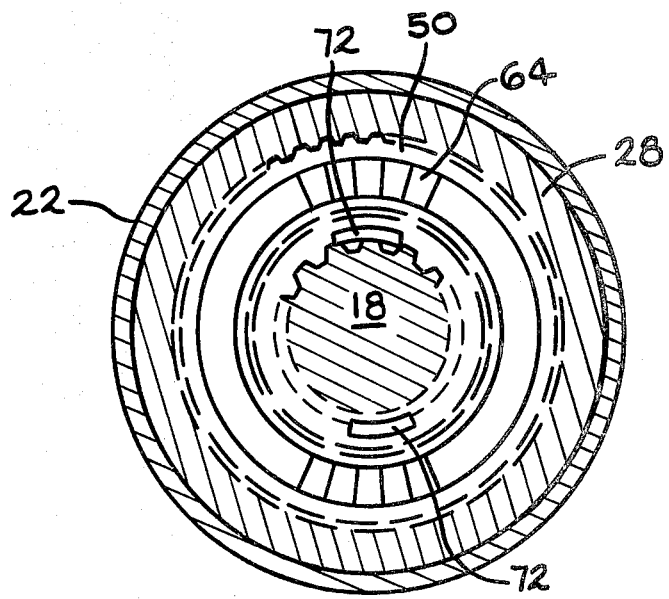
FIG. 5 is a view taken along line 5—5 of FIG. 2.

Attention is now directed to the manual locking device designed to lock the hub 22 to the axle shaft 18 and override the overrunning clutch of the automatic locking mechanism. In a preferred embodiment, the manual locking device comprises an axially fixed inner clutch member or ring 50 and an axially movable outer clutch member or locking ring 52. Inner clutch ring 50 is positioned adjacent the external ends of rollers 24 and has a plastic bearing 55 at its outer circumferential surface which pilots it with respect to the outer race 28. The inner circumferential portion of the clutch ring 50 has splines 58 mating with external splines 60 formed on an inner race extension 62 so that the clutch ring 50 rotates with the inner race 26. Curvic clutch teeth 64 extend from the clutch ring 50 outwardly toward the locking ring 52. The inner race 26 is non-rotatably fixed to the axle shaft 18 by a splined attachement shown generally at 66. A shaft retainer 68 has an annular sleeve portion formed with an annular outwardly extending flange 70 adapted to fit against the inner radial face of the inner race 26. A pair of opposed axially outwardly extending fingers 72 are integrally constructed on the sleeve portion and pass under the inner race 26 by omitting opposed portions of the spline teeth as illustrated in FIG. 5. The outer ends of the fingers 72 are bent inwardly to form a locking tab 74 which engages a groove 76 adjacent the end of axle shaft 18.

Clutch ring 50 is maintained in a fixed axial position by a pair of snap rings 78 located on opposite sides of the clutch ring 50 and fitted in suitable grooves provided in the interior of the outer race 28. In the preferred embodiment the annular spacer bushing 55 is provided between the snap rings 78 and serves as a pilot for the clutch ring 50.

The outer locking ring 52 is disposed between the inner clutch ring 50 and a manual selector 80. Locking ring 52 has external flutes 82 slidably engaging the internal flutes 56 of the outer race 28. Curvic clutch teeth 84 are formed on the interior face of the locking ring 52 for selectively mating with the curvic clutch teeth 64 of the inner clutch ring 50.

Figure 3:
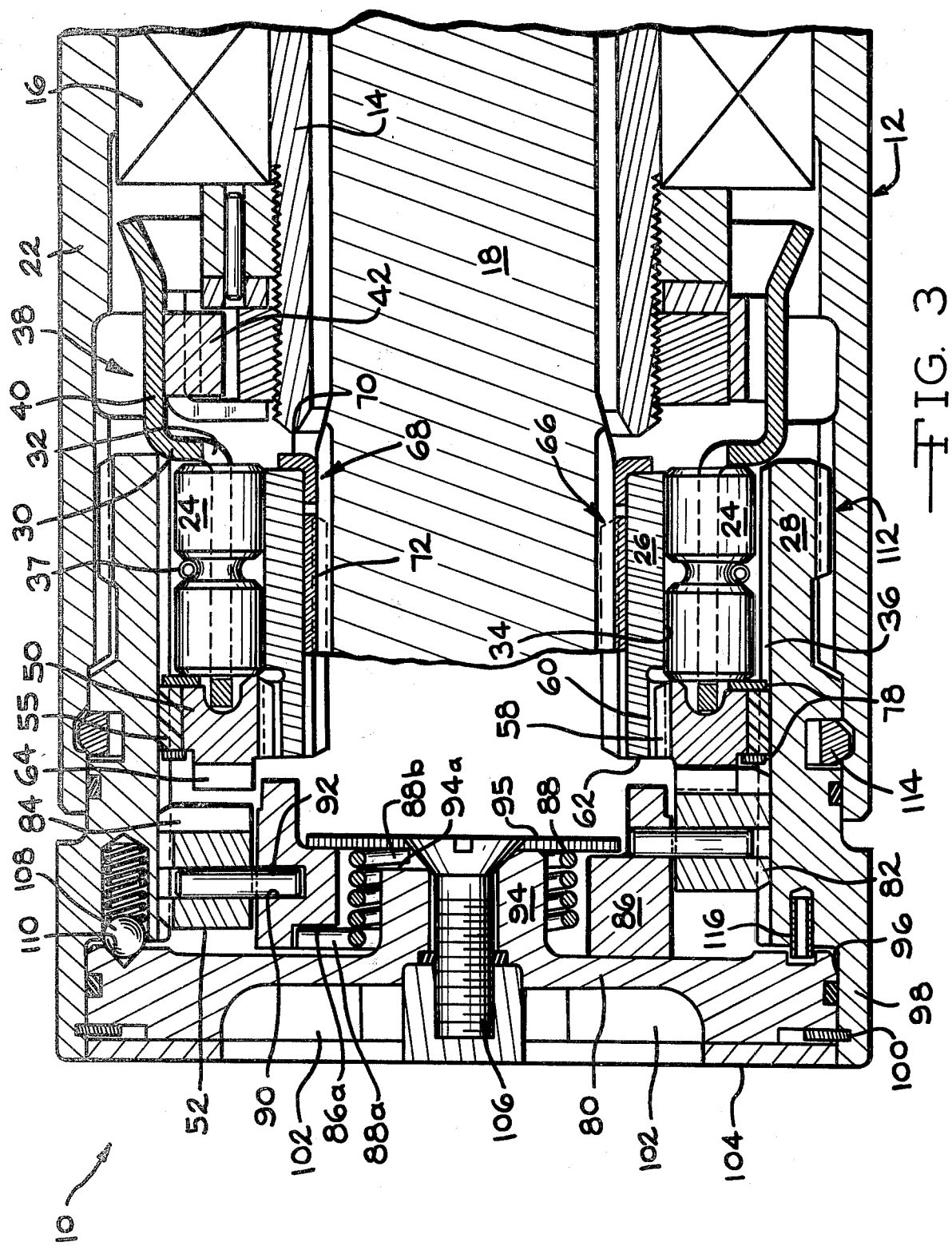
FIG. 3 is a partial enlarged view similar to FIG. 2 with the upper portion of the clutch means in its disengaged position and the lower portion in its engaged position.
Figure 6:
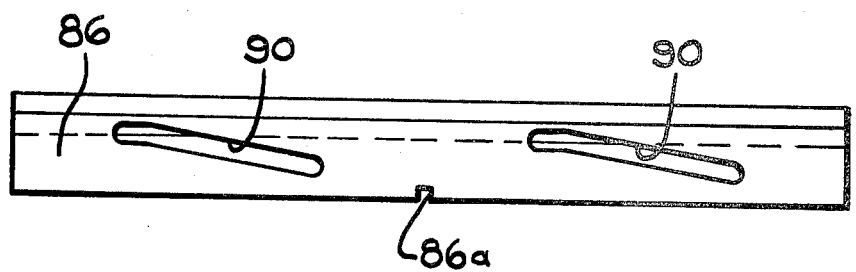
FIG. 6 is a developed detail view of the cam slot arrangement provided for the cam ring of the present invention.

A cam ring 86 and a torsion spring 88 are provided between the manual selector 80 and locking ring 52 for effecting axial movement of the locking ring 52 with respect to the inner clutch ring 50 in response to rotation of the selector 80. The curvic clutch teeth 84 can thereby be moved between engaged and disengaged positions with respect to curvic clutch teeth 64. The cam ring 86 is constructed with a pair of identical cam slots 90, FIG. 6, for receiving follower pins 92 secured to locking ring 52. Cam ring 86 is annular and concentrically disposed about and in spaced relation to an inwardly extending annular hub 94 on the interior of the selector 80. In the preferred embodiment, the resilient coupling means of the hub clutch 10 is the torsion spring 88 which is disposed in a chamber defined by an interior annular surface of the locking ring 52 and an external annular surface of the selector hub 94. The torsial spring 88, in its free state as shown in the upper portion of FIG. 3, is located midway between these surfaces. This permits the coils to wind down and unwind without binding. A radially outward extending first end portion or leg 88a is located in a notch 86a in the cam ring 86 and a radially inwardly extending second end portion or leg 88b is located in a notch 94a in the control knob hub 90 so that both ends are fixed to their respective members. An annular end plate 95 is secured to the internal end face of the selector hub 94 and is of such a diameter as to overlie and engage a portion of the cam ring 86 and to retain spring end 88b in the selector hub slot 94a. End plate 95 axially restrains the cam ring 86 while permitting it to rotate relative to the selector hub 94. As seen in FIG. 3, the end plate 95 completely closes the annular chamber which houses the torsion spring 88 thereby protecting the same from interference with other parts of the hub clutch 10. An added advantage in this arrangement is that minimum axial space is required for functioning of the spring 88.

The cam slots 90 and mating follower pins 92 constitute cam means for operatively connecting the cam ring 86 and locking ring 52. Rotation of the selector 80 causes the torsion spring 88 to rotate cam ring 86, thereby allowing the cam means to move the locking ring 52 axially along the center line of the axle shaft 18. If this movement is not complete due to torque windup or tooth misalignment, spring 88 is preloaded in either direction. The cam slots 90 translate movement to the locking ring 52 as the selector 80 is rotated between its "free" and "locked" position.

Figure 1:
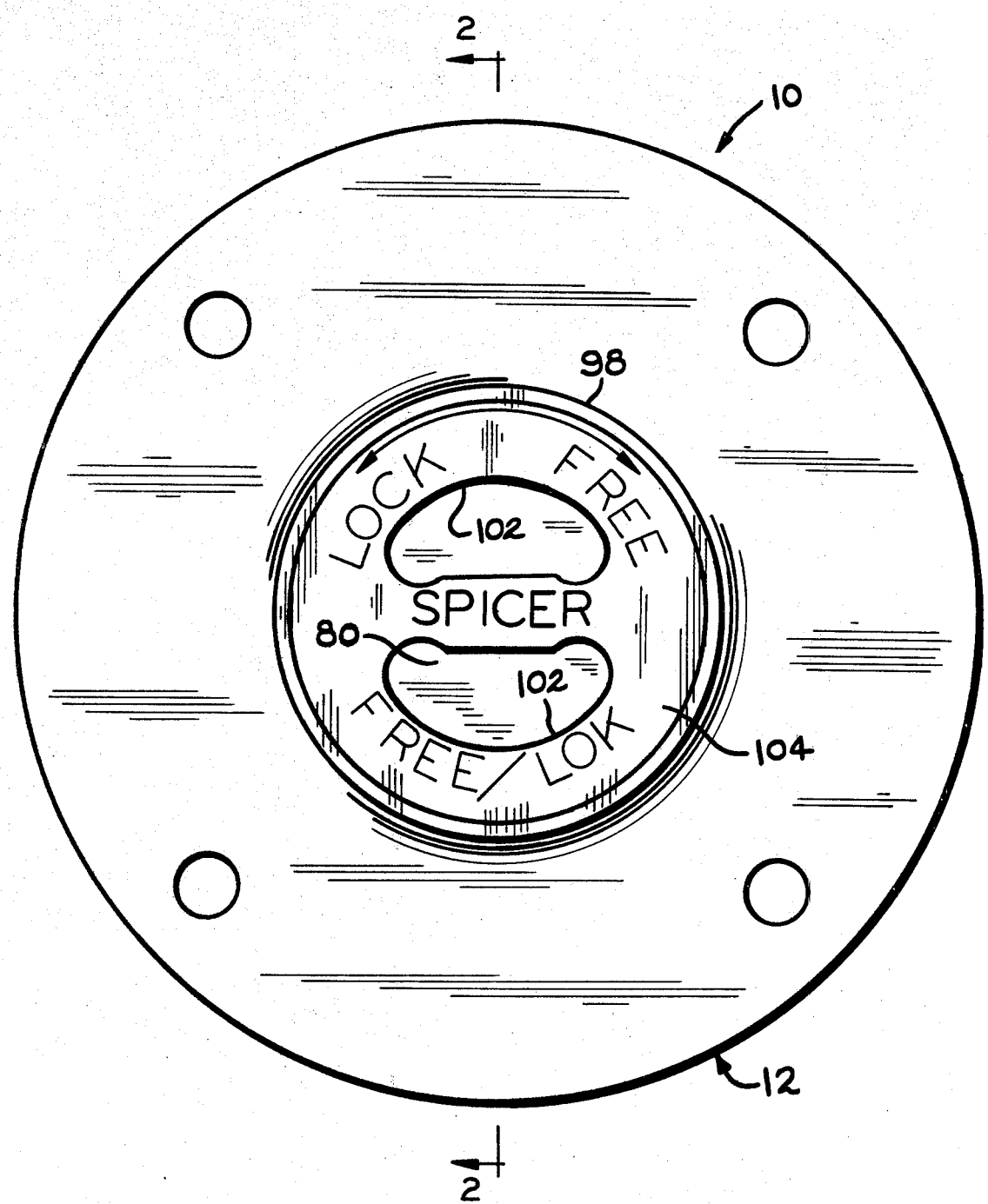
FIG. 1 is an end view of the hub clutch of the present invention.

As seen in FIG. 1, the annular selector 80 is rotatable between a "lock" position and a "free" position. With reference to FIG. 3, the selector 80 is rotatably mounted in a recess 96 provided in the outer end of a housing section 98 which is formed as an extension of the outer race 28. A snap ring 100 holds the selector 80 in its operative position within the recess 96.

Referring to FIG. 3, it will be apparent that, as the selector 80 is rotated in either direction, torsion spring 88 translates the rotational movement to the cam ring 86 through the leg connections 88a and 88b. During rotation of the cam ring 86, the cam slot 90 drives the follower pin 92 in an axial direction, thereby moving the locking rings 52 in a longitudinal direction along the outer race flutes 36. During this operation, locking ring clutch teeth 84 are moved toward inner ring clutch teeth 64. If the clutch teeth 84 and 64 butt and cannot engage due to misalignment, the rotation of the selector 80 is continued and the coils of the torsion spring 88 are twisted or wound around the axis of the spring and store energy therein. When the clutch teeth 84 and 64 align, spring 88 is permited to release this stored energy by unwinding, thereby exerting torque through the leg 88a which snaps the clutch teeth 84 and 64 into full engagement such as shown in the lower portion of FIG. 3. With the parts in this position the inner race 26, by the splined connection 58 and 60 with the inner clutch ring 50, and the outer race 28, by means of the spline connection of flutes 36 and 82, will be positively interlocked. In this position the overrunning clutch is bypassed with rotation of the axle shaft 18 transmitted directly to the hub 22.

For operating purposes finger grip recesses 102—102 are provided in the end face of the selector 80 for manually turning the selector between the "lock" and "free" positions (see FIG. 1). In the preferred embodiment, the recesses 102 are formed by a cover plate 104 secured to the outside of the selector 80 by a screw 106 which also functions as the means for fixing the end plate 95 to the selector hub 94 (see FIG. 3). It will be apparent that, if desired, selector 80 and plate 104 could be constructed as an integral part. A spring loaded ball detent 108 engages suitable notches 110 (only one shown) when the selector 80 is in either the "lock" or "free" position. The selector 80 is held in either position by the ball detent until the lock ring clutch teeth 84 and inner ring clutch teeth 64 are fully engaged or disengaged. A positive stop may also be provided by pin 116 for limiting the turning movement of the selector 80, thus preventing spring damage by turning the selector 80 beyond its defined travel as shown on FIG. 1.

To engage the mechanical portion of the hub clutch 10, the selector 80 is turned to the "lock" position. In this position outer locking ring clutch teeth 84 and inner ring clutch teeth 64 are meshed, thereby connecting the axle shaft 18 to the hub 22 and transmitting drive to the wheel. To disengage the hub clutch 10, the selector 80 is turned to the "free" position wherein the clutch teeth 84 and 64 are separated and the hub 22 is free to overrun the axle shaft 18. The wheels (not shown) may therefore turn freely on the spindle 14.

Referring to FIG. 3, it will be seen that the outer race 28 forms a housing for completely enclosing both the automatic and manual portions of the hub clutch 10. Further, the outer race 28 is connected to the hub 22 at its inboard end by a splined connection shown generally at 112 to prevent relative rotation between these two members. The outer race 28 is axially retained in the hub 22 by a snap ring 114 located in suitable annular groove in the outer race 28 adjacent the outer end of the wheel hub 22.

From the above, it will be evident that the various hub components are supported in a unitized fashion by the outer race 28 which facilitates easy assembly of the unit into the axle. The locking hub 20 is a self-contained unit which is retained within the hub 22 by the internal expanding snap ring 114.

It will also be apparent that the torsion spring 88 is a direct means for turning the cam ring 86 which, through the cam means, engages and disengages the movable locking ring 52 with the fixed inner clutch member 50. Further, the winding and unwinding of the spring 88 engages and disengages the movable locking ring 52 when misalignment or frictional drag are encountered between the clutch teeth 64 and 84.

The present invention therefore provides a locking hub having an improved resilient coupling connection which allows clutch engagement and disengagement to be performed in a simple and positive manner by a torsion spring.

Although the foregoing structure has been described for the purpose of illustrating a presently preferred embodiment of the invention, it should be understood that modifications or alterations may be made without departing from the spirit and scope of the invention as set forth in the appended claims.

What is claimed is:

1. A clutch for a four-wheel drive vehicle for drivingly connecting a shaft rotatable about an axis and a wheel hub, said clutch comprising:
   (a) an axially fixed clutch member connected to the shaft,
   (b) an axially movable clutch member slidably connected to the wheel hub and selectively engageable with said fixed clutch member,
   (c) a rotatable selector supported by the wheel hub, said selector including a hub having an annular exterior surface,
   (d) a follower connected to said movable clutch member,
   (e) a rotatable cam ring having a cam slot engaged with said follower, said cam ring having an annular interior surface concentrically disposed about said selector hub exterior surface, said surfaces spaced apart and defining an annular chamber therebetween, and
   (f) a coiled torsion spring for connecting said rotatable selector and said cam ring, said coiled torsion spring disposed in said annular chamber having first and second ends, said first end connected to said rotatable selector and said second end connected to said cam ring.

2. A clutch according to claim 1 wherein said first end extending radially outwardly into engagement with said cam ring, said second end extending radially inwardly into engagement with said selector hub.

3. A clutch according to claim 2 wherein an end plate is connected to said selector hub and closes said annular chamber.

4. A clutch according to claim 3 wherein said selector is rotatable in one direction to establish an operative position and in an opposite direction to establish an inoperative position whereby rotation of said selector in said one direction winds said torsion spring and rotates said cam ring to move said follower in said cam slot and said movable clutch member into engagement with said fixed clutch member for drivingly connecting the wheel hub and shaft and whereby rotation of said selector in said opposite direction unwinds said torsion spring and rotates said cam ring to move said follower in said cam slot and slide said movable clutch member out of engagement with said fixed clutch member to disconnect the wheel hub and shaft.

* * * * *